Nov. 9, 1948.                    H. V. DWIGHT                    2,453,209
                        DRIVE FOR TRACK-LAYING VEHICLES
                              Filed Nov. 1, 1945
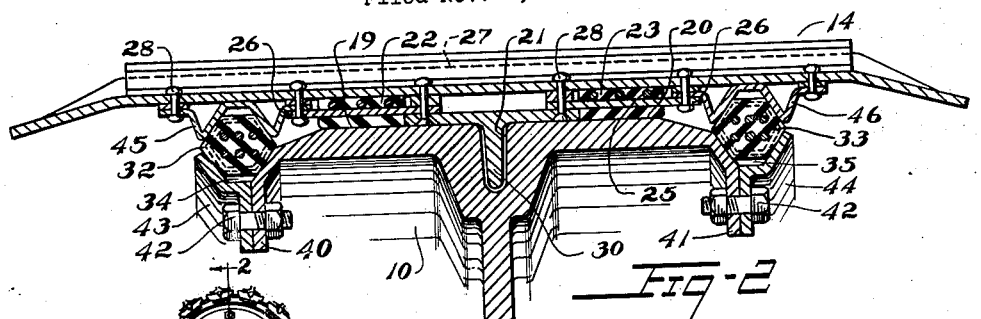
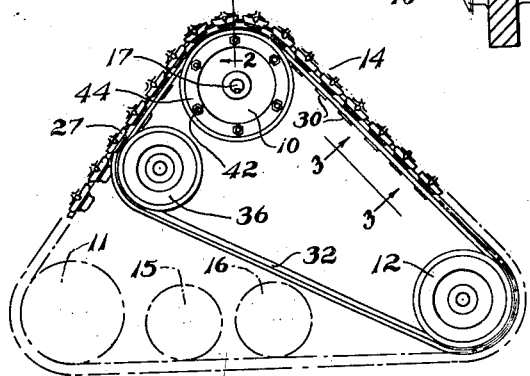
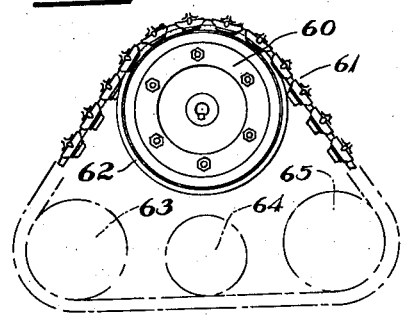
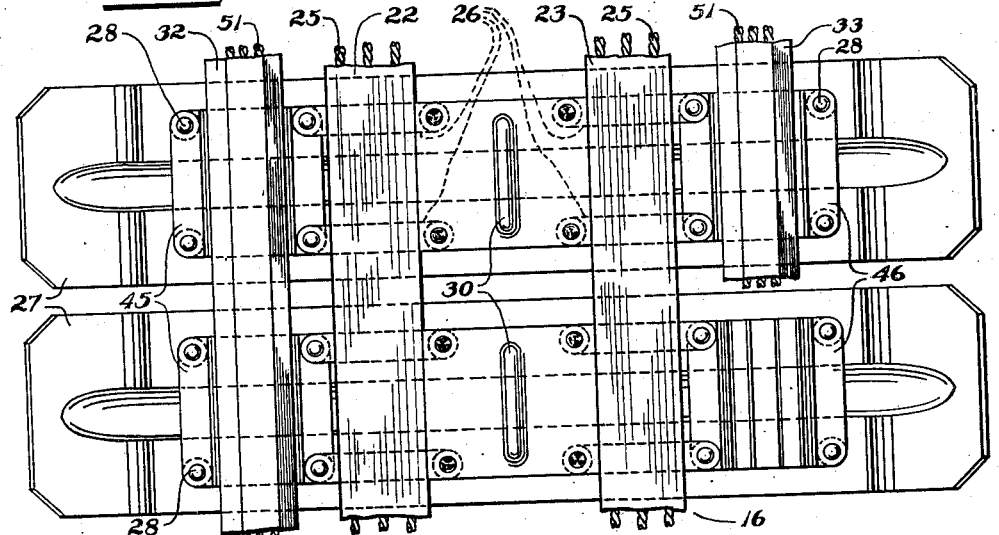
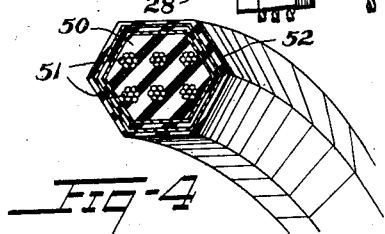
Inventor
Herbert V. Dwight
By
Atty.

Patented Nov. 9, 1948

2,453,209

UNITED STATES PATENT OFFICE 2,453,209

DRIVE FOR TRACK-LAYING VEHICLES

Herbert V. Dwight, Akron, Ohio, assignor to The B. F. Goodrich Company, New York, N. Y., a corporation of New York Application November 1, 1945, Serial No. 626,010

9 Claims. (Cl. 305—9)

This invention relates to drives for track-laying vehicles and is especially useful in providing a track-laying drive for tractors although the invention may also be applicable to other vehicles.

The principal objects of the invention are to provide a smooth operating frictional drive, to reduce noise and wear, to provide good support of the track throughout its width, to provide positive and continuous guiding, and to provide simplicity of construction.

These and other objects will appear from the following description and the accompanying drawings.

Of the drawings:

Fig. 1 is a side elevation of an embodiment of the invention, parts being broken away and indicated in dot and dash lines.

Fig. 2 is a cross sectional view thereof, taken on line 2—2 of Fig. 1.

Fig. 3 is a driving face view of a portion of the track as indicated at 3—3 of Fig. 1, showing also the guiding and driving belts, parts being broken away.

Fig. 4 is a perspective view of a section of one of the belts.

Fig. 5 is a view similar to Fig. 1 showing a modified form of the invention.

Referring to the drawings, and first to Figs. 1 to 4 thereof, inclusive, the numeral 10 designates a drive wheel and 11, 12 are guide wheels about which band track 14 is trained. The guide wheels 11, 12 together with other guide wheels such as 15, 16 distribute the load of the vehicle to the lower substantially flat reach of the track which contacts the ground. The drive wheel 10 is fixed to a rotatable axle 17 driven by the engine of the vehicle, and the guide wheels are all supported by a frame (not shown) secured to an axle housing about the axle 17, and are free to rotate with respect to the frame.

The drive wheel 10 is formed with cylindrical surfaces 19, 20 of equal diameter separated by a peripheral groove 21. The track is of spaced apart longitudinal bands 22, 23 of rubber or other rubber-like material, each having a plurality of substantially inextensible longitudinal tension members 25, preferably in the form of metal cables embedded therein. Cross bars 26, individual to each band, are embedded therein laterally thereof with their ends exposed at each side of the bands, and shoes 27 preferably of sheet metal, extend across the ground faces of the bands and are secured to each in closely spaced-apart relation by rivets 27. Guide lugs 30 are also secured to the cross bars 26 by the rivets 28 and extend into the groove 21 for guiding the track. The guide wheels 11, 12, 15 and 16 also have cylindrical band contacting portions separated by guide grooves for clearing the lugs 30.

For driving the track and assisting in guiding and supporting it a pair of endless belts 32, 33 preferably of hexagonal cross-section and shorter than the track are trained about driving grooves 34, 35 at the margins of the drive wheel and about similar grooves of the guide wheel 12 and a guide wheel 36. The driving grooves are provided by inwardly directed radial flanges 40, 41 of the drive wheel to which are secured, as by bolts 42, removable flanges 43, 44. The flanges 40, 41 and the flanges 43, 44 have conical faces spaced apart to engage beveled side faces of the belts which seat against the drive faces clear of the bottoms of the grooves providing wedging drive action.

For engaging the belts in driving relation thereto, V-notched belt-engaging members 45, 46 are secured to the track at regular intervals therealong, preferably at each shoe, and have notches which engage over beveled faces of the belts which clear the bottoms of the notches. The arrangement is such that the drive wheel drives the belts which in turn engage and drive the track, while at the same time quiet guiding of the track is provided by the belts which cause the lugs 30 to normally clear the guide grooves 21.

The belts 32, 33 are preferably formed of a body 50 of soft vulcanized rubber or other rubber-like material in which substantially inextensible tension members 51 are embedded. A covering 52 of textile material such as bias cut woven fabric surrounds the body 50 to provide a better wear surface.

In the form of the invention shown in Fig. 5, the drive pulley 60 and the track 61 are identical with the drive pulley 10 and track 14 of Figs. 1 to 3. In this form of the invention the driving belts 62 are shorter than those of Figs. 1 to 3 but are of the same cross section and construction as that shown in Fig. 4. Preferably these belts are not substantially greater in circumference than the driving grooves of the wheel 60 and may closely embrace the wheel. The track is driven by contact of its V-grooved belt-engaging members over the belts 62 through the arc of contact of the track with the drive wheel and no guide wheels for the belts are provided. The track is guided about the guide wheels 63, 64, 65 which also support the load of the vehicle.

In each of the embodiments of the invention, while the resilient bands of the track have cushioning contact with the drive and guide wheels, driving of the track is principally accomplished by the frictional engagement of the driving belts between the V-grooves of the drive wheel and the grooved driving members of the track due to the wedging action of the belts. Also, while the guide lugs act as a secondary guide means to prevent lateral displacement of the track from the wheels, a primary guide means having constant contact with the drive wheel is provided by the interlocking engagement of the belts between the drive wheel and the track. This feature reduces noise to a minimum and provides smooth driving and guiding.

Variations may be made without departing from the scope of the invention as it is defined by the following claims.

I claim:

1. A drive for self-laying track type vehicles, said drive comprising a drive wheel, guide wheels, an endless flexible track trained about said drive and guide wheels, and a plurality of endless belts of less length than said track and trained about said drive wheel for supporting and guiding said track therefrom, said belts having side face portions converging outwardly for wedging engagement with said track and portions converging inwardly for wedging engagement with said drive wheel.

2. A drive for self-laying track type vehicles, said drive comprising a drive wheel guide wheels, an endless flexible track trained about said drive and guide wheels, and a plurality of endless belts of less length than said track and trained about said drive wheel for supporting and guiding said track therefrom, said belts being of hexagonal cross-section having side face portions converging inwardly for wedging engagement with said drive wheel and portions converging outwardly for wedging engagement with said track.

3. A drive for self-laying track type vehicles, said drive comprising a drive wheel having peripheral V-grooves at its lateral margins, guide wheels, an endless flexible track trained about said drive and guide wheels, said track having V-grooved driving means on its inner face, and a plurality of endless belts of less length than said track and trained about said drive wheel and having inwardly converging side faces within said peripheral V-grooves for supporting and guiding said track therefrom, said belts having outwardly converging side faces driving engagement with said V-grooved driving means.

4. A drive for self-laying track type vehicles, said drive comprising a drive wheel having a track-engaging face separated by a guiding groove and belt-engaging V-grooves at its lateral margins, guide wheels, an endless flexible track trained about said drive and guide wheels in contact with said belt-engaging face, said track having V-grooved driving means on its inner face, and a plurality of endless belts of less length than said track and trained about said drive wheel between the latter and said track and each belt having a pair of outwardly converging side faces and a pair of inwardly converging side faces engageable respectively with said V-grooved driving means and said belt-engaging grooves of said drive wheel, said track having guide means engaging in said guiding groove of said drive wheel.

5. A track for self-laying track type vehicles having V-grooved driving and guiding wheels and belts located in said grooves for driving a track therefrom, said track comprising laterally spaced-apart flexible bands of rubber-like material, longitudinal reinforcing members extending through said bands, ground-engaging shoes attached to said bands at intervals, and driving means on said shoes having V-grooves for engaging said belts and said belts each having a pair of outwardly converging side faces engageable in the grooves of said shoes and drive wheel for frictionally driving said track from said drive wheel.

6. A track for self-laying track type vehicles having V-grooved driving and guiding wheels and belts of hexagonal cross-section located in said grooves for driving a track therefrom, said track comprising laterally spaced-apart flexible bands of rubber-like material, longitudinal reinforcing members extending through said bands, ground-engaging shoes attached to said bands at intervals, and driving means on said shoes having V-grooves for engaging said belts and frictionally driving said track from said drive wheel, said driving means comprising metal straps arranged to seat over said belts.

7. A drive for self-laying track type vehicles, said drive comprising a drive wheel having a track-engaging face separated by a guiding groove and having belt-engaging V-grooves at its lateral margins, guide wheels, an endless flexible track trained about said drive and guide wheels in contact with said track-engaging face, said track comprising flexible tension bands for engaging said wheel, shoes secured to said bands at intervals, guide means on said shoes for engaging said guiding groove, and belt-seating members on said shoes having pairs of belt seating surfaces angularly convergent in a direction toward the track, and a pair of flexible belts unattached to said wheels and said track between said drive wheel and said track for transmitting motion from one to the other, said belts each having inwardly converging side faces for engaging a V-groove of the wheel and outwardly converging side faces for engaging said belt seating surfaces of said shoes.

8. A track assembly for a self-laying track type vehicle, said assembly comprising a track, a wheel, said track and wheel comprising opposed V-grooves, and a belt between and unattached to said track and wheel and comprising a pair of outwardly converging and a pair of inwardly converging side faces engageable respectively in the V-groove of said track and the V-groove of said wheel.

9. A track assembly for a self-laying track type vehicle, said assembly comprising a track, a plurality of wheels, said track and said wheels having opposed V-grooves, and a plurality of belts between and unattached to said track and wheels and each comprising a pair of outwardly converging and a pair of inwardly converging side faces engageable respectively in the V-groove of said track and the V-grooves of said wheels.

HERBERT V. DWIGHT.

REFERENCES CITED

The following references are of record in the file of this patent:

UNITED STATES PATENTS

| Number | Name | Date |
| --- | --- | --- |
| 1,397,314 | Cox | Nov. 15, 1921 |
| 1,487,340 | Kroupsky | Mar. 18, 1924 |
| 2,318,992 | Gray | May 11, 1943 |
| 2,326,477 | Mayne | Aug. 10, 1943 |